United States Patent
Sekido (10) Patent No.: US 10,062,480 B2
(45) Date of Patent: Aug. 28, 2018

(54) CABLE CONNECTION STRUCTURE, CABLE ASSEMBLY, METHOD FOR MANUFACTURING CABLE ASSEMBLY, AND METHOD FOR MANUFACTURING CABLE CONNECTION STRUCTURE

(71) Applicant: OLYMPUS CORPORATION, Tokyo (JP)

(72) Inventor: Takanori Sekido, Machida (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/789,126

(22) Filed: Jul. 1, 2015

(65) Prior Publication Data
US 2016/0005512 A1 Jan. 7, 2016

(30) Foreign Application Priority Data

Jul. 2, 2014 (JP) .................................. 2014-137138

(51) Int. Cl.
*H02G 15/02* (2006.01)
*H02G 15/08* (2006.01)
(Continued)

(52) U.S. Cl.
CPC ..... *H01B 13/01263* (2013.01); *H01R 13/025* (2013.01); *H02G 1/14* (2013.01)

(58) Field of Classification Search
CPC ........ H01B 7/40; H01R 4/023; H01R 12/718; H01R 12/79; H01R 13/025; H01R 12/53;
(Continued)

(56) References Cited

U.S. PATENT DOCUMENTS 5,231,248 A * 7/1993 Shah ...................... H01B 1/026
174/74 R
5,879,285 A * 3/1999 Ishii ......................... A61B 1/05
348/75

(Continued)

FOREIGN PATENT DOCUMENTS

JP 2008-258052 A 10/2008
JP 2011-023134 A 2/2011
JP 2011238458 A * 11/2011

OTHER PUBLICATIONS

Machine Translation of Sekido (JP2011238458A) provided with Office Action.*
(Continued)

*Primary Examiner* — Chau N Nguyen
*Assistant Examiner* — Roshn Varghese
(74) *Attorney, Agent, or Firm* — Scully, Scott, Murphy & Presser, P.C.

(57) ABSTRACT

A cable connection structure includes a cable assembly that fixes a plurality of cables, and a mounting member connected to the cable assembly. The plurality of cables includes: core wires having core wire exposed portions where the core wires are exposed at distal ends of the plurality of cables; and jackets, each of which is formed of an insulator and covers each of the core wires. The mounting member includes a plurality of external connection electrodes to which the core wires are to be connected. The cable assembly includes a first cable fixing portion that is formed of an insoluble resin insoluble in organic solvents or alkali and that fixes the core wire exposed portions. The core wires are exposed on an end face of the first cable fixing portion and are connected to the plurality of external connection electrodes using a conductive material.

2 Claims, 8 Drawing Sheets (51) Int. Cl.
*H01B 13/012* (2006.01)
*H01R 13/02* (2006.01)
*H02G 1/14* (2006.01)

(58) Field of Classification Search
CPC .... H01R 12/55; H01R 43/0256; H01R 12/61; H02G 15/04; H02G 15/076; H02G 15/02; H02G 15/08; A61B 1/00114
USPC ........ 174/75 R, 77 R, 79, 251, 268; 439/581
See application file for complete search history.

(56) References Cited

U.S. PATENT DOCUMENTS

| | | | |
|---|---|---|---|
| 7,364,461 B1* | 4/2008 | Back | H01R 9/0515 439/581 |
| 2009/0120662 A1* | 5/2009 | Tanaka | H01R 12/592 174/113 R |
| 2009/0306475 A1* | 12/2009 | Yamamoto | A61B 1/05 600/110 |
| 2012/0149238 A1* | 6/2012 | Negishi | A61B 1/042 439/579 |

OTHER PUBLICATIONS

Japanese Office Action dated Dec. 26, 2017 in Japanese Patent Application No. 2014-137138.

\* cited by examiner

CABLE CONNECTION STRUCTURE, CABLE ASSEMBLY, METHOD FOR MANUFACTURING CABLE ASSEMBLY, AND METHOD FOR MANUFACTURING CABLE CONNECTION STRUCTURE

CROSS-REFERENCE TO RELATED APPLICATIONS

This application is based upon and claims the benefit of priority from Japanese Patent Application No. 2014-137138, filed on Jul. 2, 2014, the entire contents of which are incorporated herein by reference.

BACKGROUND

1. Technical Field

The disclosure relates to a cable connection structure, a cable assembly, a method for manufacturing the cable assembly, and a method for manufacturing the cable connection structure.

2. Related Art

Medical and industrial endoscopes have been widely used in these years. Some medical endoscopes are provided with, for example, an imaging apparatus that includes a CCD or other imaging element built therein at a distal end of an inserting portion to be introduced into the body. Deeply inserting this inserting portion into the body allows a lesion site to be observed. When a treatment tool is used in combination with the endoscope as necessary, an examination or treatment may be performed inside the body.

To display an image on a monitor in such a type of endoscope, image information captured by the imaging element is converted to a corresponding electric signal and the resultant electric signal is transmitted to a signal processor, so that the signal processor can perform signal processing. The imaging element in the endoscope and the signal processor are connected to each other through a cable assembly that includes a plurality of cables bound together for, for example, transmitting image signals and clock signals and supplying the imaging element with drive power.

As a technique for collectively connecting, for example, a cable assembly to a substrate, a known technique is directed to a cable assembly that includes a plurality of cables fixed in place by a cable fixing portion. The cable assembly further has a connecting end face formed to include connecting end portions of the cables and includes a conductor layer that covers surfaces of the connecting end portions (see, for example, Japanese Patent Application Laid-open Publication No. 2011-23134).

SUMMARY

In accordance with some embodiments, a cable connection structure, a cable assembly, a method for manufacturing the cable assembly, and a method for manufacturing the cable connection structure are presented.

In some embodiments, a cable connection structure includes a cable assembly that fixes a plurality of cables, and a mounting member connected to the cable assembly. The plurality of cables includes: core wires having core wire exposed portions where the core wires are exposed at distal ends of the plurality of cables; and jackets, each of which is formed of an insulator and covers each of the core wires. The mounting member includes a plurality of external connection electrodes to which the core wires are to be connected. The cable assembly includes a first cable fixing portion that is formed of an insoluble resin insoluble in organic solvents or alkali and that fixes the core wire exposed portions. The core wires are exposed on an end face of the first cable fixing portion and are connected to the plurality of external connection electrodes using a conductive material.

In some embodiments, a cable assembly includes: a plurality of cables including: conductive core wires; and jackets, each of which is formed of an insulator and covers an outer periphery of each of the core wires, the core wires having core wire exposed portions where the core wires are exposed at distal ends of the plurality of cables and having core wire covering portions where the core wires are covered by the jackets at proximal ends of the plurality of cables; a first cable fixing portion that is formed of an insoluble resin insoluble in organic solvents or alkali and fixes the core wire exposed portions; and a second cable fixing portion that is formed of a soluble resin soluble in organic solvents or alkali and fixes the core wire covering portions. The core wires have end faces exposed on a first surface of the first cable fixing portion. The first surface is opposite to a second surface of the first cable fixing portion that is in contact with the second cable fixing portion.

In some embodiments, a method for manufacturing a cable assembly that fixes a plurality of cables is presented. The plurality of cables includes: core wires; and jackets, each of which is formed of an insulator and covers each of the core wires. The core wires has core wire exposed portions where the core wires are exposed at distal ends of the plurality of cables and has core wire covering portions where the core wires are covered by the jackets at proximal ends of the plurality of cables. The method includes: fixing the core wire exposed portions with a first cable fixing portion formed of an insoluble resin insoluble in organic solvents or alkali; fixing the core wire covering portions with a second cable fixing portion formed of a soluble resin soluble in organic solvents or alkali; and cutting the first cable fixing portion at a desired position perpendicularly to an axial direction of the plurality of cables to expose the core wires.

In some embodiments, a method for manufacturing a cable connection structure for connecting a cable assembly to a mounting member on which external connection electrodes are formed is presented. The cable assembly fixes a plurality of cables including: core wires; and jackets, each of which is formed of an insulator and covers each of the core wires. The core wires has core wire exposed portions where the core wires are exposed at distal ends of the plurality of cables and has core wire covering portions where the core wires are covered by the jackets at proximal ends of the plurality of cables. The method includes: fixing the core wire exposed portions with a first cable fixing portion formed of an insoluble resin insoluble in organic solvents or alkali; fixing the core wire covering portions with a second cable fixing portion formed of a soluble resin soluble in organic solvents or alkali; cutting the first cable fixing portion at a desired position perpendicularly to an axial direction of the plurality of cables to expose cross sections of the core wires; clamping the first cable fixing portion and the second cable fixing portion with a jig; causing an end face of the first cable fixing portion on which the core wires are exposed to face a mounting surface on which the external connection electrodes of the mounting member are formed, to connect the core wires to the external connection electrodes using a conductive material; disposing a reinforcing resin around the core wires, the external connection electrodes, and the conductive material; and dissolving and removing the second cable fixing portion using an organic solvent.

The above and other features, advantages and technical and industrial significance of this invention will be better understood by reading the following detailed description of presently preferred embodiments of the invention, when considered in connection with the accompanying drawings.

DETAILED DESCRIPTION

Modes for carrying out the present invention (hereinafter referred to as "embodiment(s)") will be described below with reference to the accompanying drawings. The present invention is not limited to the embodiments. The same reference signs are used to designate the same elements throughout the drawings. The drawings are schematic and are not scaled to exact sizes, so that care should be used to note that, for example, a thickness to a width in one member and a ratio of one member to another may be different from they are in actual mechanism. The drawings further contain portions of varying dimensional relations and ratios among different drawings.

Figure 1:
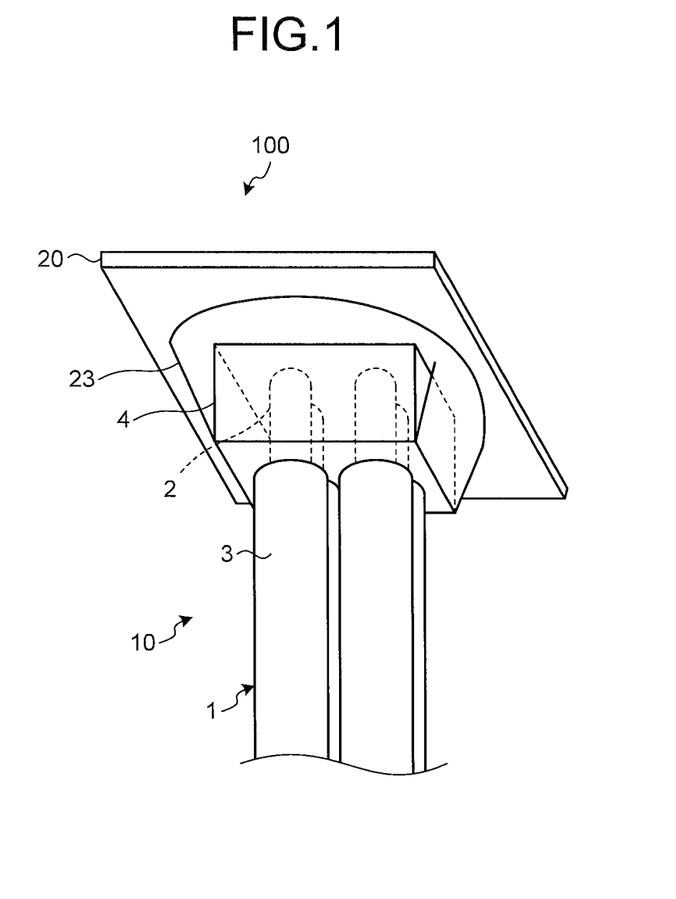
FIG. 1 is a perspective view of a cable connection structure according to an embodiment of the present invention.
Figure 2:
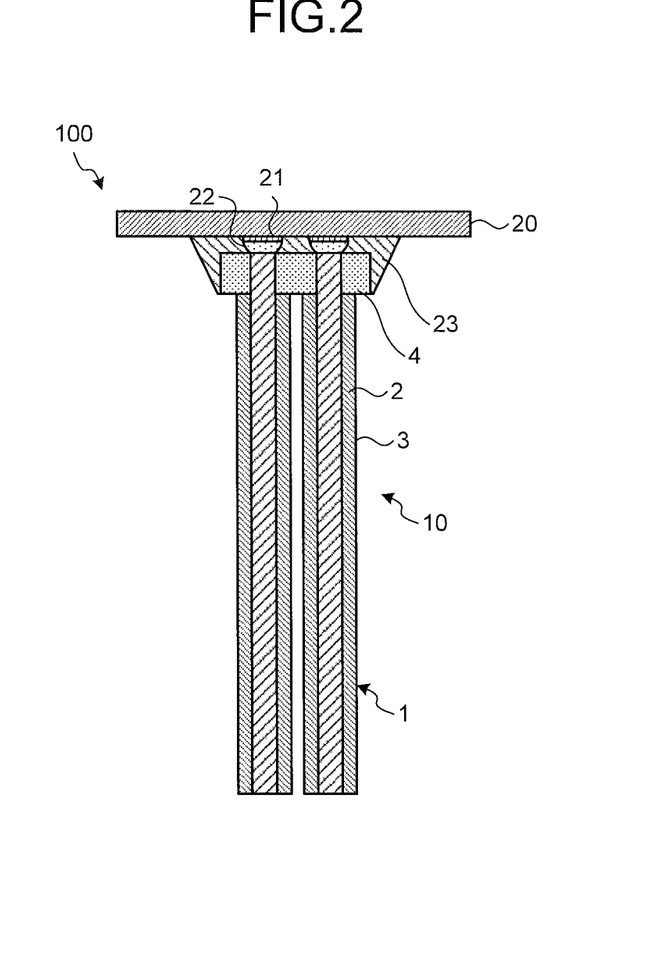
FIG. 2 is a sectional view of the cable connection structure illustrated in FIG. 1.
Figure 3:
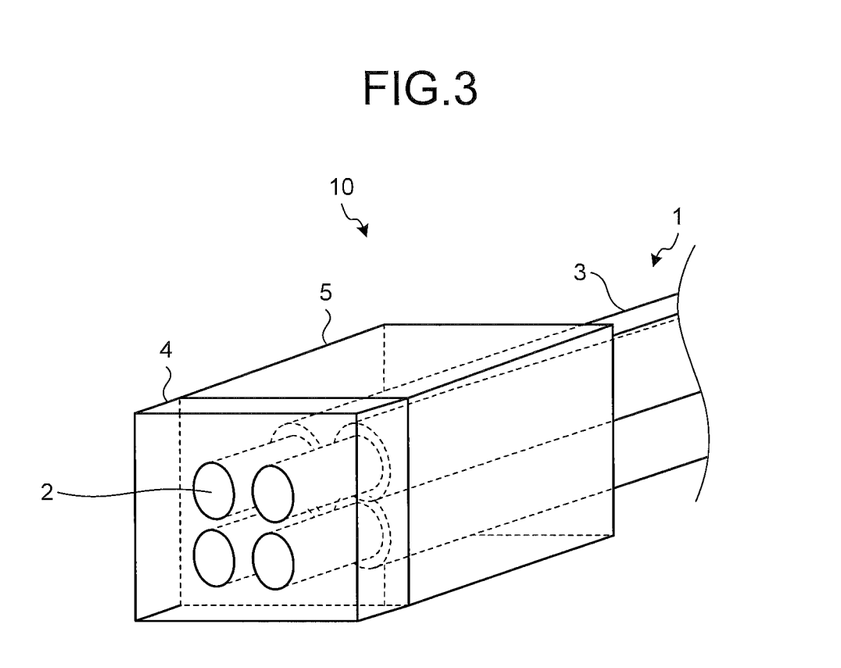
FIG. 3 is a perspective view of a cable assembly included in the cable connection structure of the embodiment.
Figure 4:
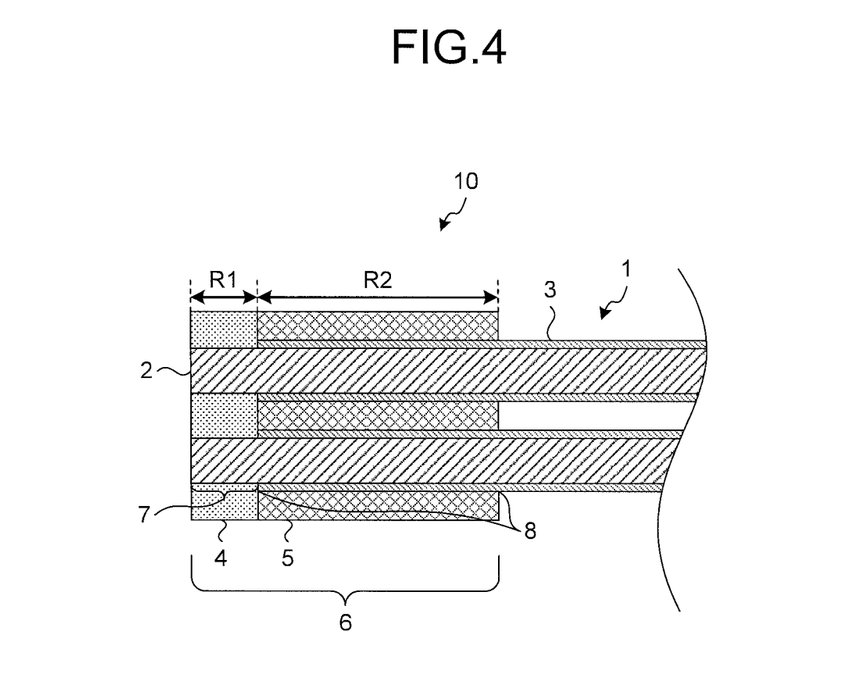
FIG. 4 is a sectional view of the cable assembly illustrated in FIG. 3.

Reference will be made to a cable connection structure according to the embodiment. FIG. 1 is a perspective view of a cable connection structure according to the embodiment of the present invention. FIG. 2 is a sectional view of the cable connection structure illustrated in FIG. 1. FIG. 3 is a perspective view of a cable assembly included in the cable connection structure of the embodiment. FIG. 4 is a sectional view of the cable assembly illustrated in FIG. 3.

As illustrated in FIG. 1, a cable connection structure 100 according to the embodiment includes a cable assembly 10 and a mounting member 20. The cable assembly 10 fixes therein four cables 1. The mounting member 20 is connected to the cable assembly 10.

The cable 1 includes a conductive core wire 2 and a jacket 3 formed of an insulator to cover an outer periphery of the core wire 2. The cable 1 has a distal end side having a specified length of the jacket 3 stripped to thereby form a core wire exposed portion 7 over which the core wire 2 is exposed (see FIG. 4).

A first cable fixing portion 4 formed of an insoluble resin that is insoluble in organic solvents or alkali surrounds to fix in place the core wire exposed portion 7. Preferably, the first cable fixing portion 4 fixes the core wire exposed portion 7 so as to cover generally the core wire exposed portion 7 over which the core wire 2 is exposed. This is because a short circuit, for example, may occur if the core wire exposed portion 7 is not covered in the first cable fixing portion 4. Preferably, the first cable fixing portion 4 is formed into a rectangular column in order to achieve steady holding upon connection to the mounting member 20, or formed into a circular column having a diameter equal to or smaller than a jacket assembly (not illustrated) that covers generally the cable assembly 10 in order to make a cable connection as compact as feasible.

The insoluble resin used as the material for the first cable fixing portion 4 is insoluble in organic solvents or alkali. The insoluble resin to be used as the material for the first cable fixing portion 4 does not necessarily have to be insoluble in all types of organic solvents and alkali and is required only to be insoluble in the organic solvent or alkali used as a solvent to dissolve a second cable fixing portion to be described later. In addition, the insoluble resin preferably has such a high hardness as to ensure a fixing force that can withstand a load during connection to the mounting member 20 and positional accuracy. An epoxy resin, for example, used as a molding resin can be suitably used as the insoluble resin. The molding epoxy resin, having a high glass transition temperature of 140 to 200° C., can reduce thermal deformation during joining of the mounting member 20 by heating. In addition, heat produced during the connection to the mounting member to be described later can cause the first cable fixing portion 4 to swell, which changes the position of a cross section of the core wire 2 to result in connection failure. Thus, the insoluble resin selected as the material for the first cable fixing portion 4 preferably has as small a coefficient of thermal expansion as possible.

The mounting member 20 is a flat substrate having an external connection electrode 21 formed thereon to which the core wire 2 is connected. The mounting member 20 is formed of, for example, ceramics, glass epoxy, glass, or silicone. The mounting member 20, if having a mounting surface to which the cable assembly 10 is connected, may be a three-dimensional substrate.

A conductive material 22, such as a solder bump, is formed on the external connection electrode 21. The solder bump is formed by supplying a solder material onto the external connection electrode 21 through paste printing, paste dispensing, molten solder droplets spraying, and mounting, and heating the mounting member 20.

A reinforcing resin 23 is supplied to an area around the connection between the core wire 2 and the external connection electrode 21. An insoluble resin that is insoluble in organic solvents or alkali is preferably selected also for the reinforcing resin 23. It is noted that, following the connection of the core wire 2 to the external connection electrode 21, the mounting member 20 or the cable assembly 10 may undergo a temperature change to thereby develop thermal expansion. In such a case, resultant thermal stress may fracture the connection. Thus, preferably, the mounting member 20, the reinforcing resin 23, and the first cable fixing portion 4 have a substantially identical coefficient of thermal expansion.

Reference will be made to the cable assembly according to the embodiment. As illustrated in FIGS. 3 and 4, the cable assembly 10 before it is connected to the mounting member 20 has a second cable fixing portion 5. The second cable fixing portion 5, formed of a soluble resin to be dissolved in organic solvents or alkali and disposed on a proximal end side of the cables 1, fixes in place core wire covering portions 8 over which the core wires 2 are covered in the jackets 3. As with the first cable fixing portion 4, the second cable fixing portion 5 is preferably shaped into a rectangular column or a circular column in order to achieve steady holding upon connection to the mounting member 20. The first cable fixing portion 4 and the second cable fixing portion 5 may be shaped differently from each other. It is noted that end faces of the core wires 2 are exposed on a surface opposed to a surface of the first cable fixing portion 4 in contact with the second cable fixing portion 5.

The cable fixing portion in the embodiment includes the first cable fixing portion 4 and the second cable fixing portion 5. The first cable fixing portion 4 and the second cable fixing portion 5 constitute a hard portion 6. When the cable assembly 10 is held in a jig, the first cable fixing portion 4 and the second cable fixing portion 5 are held by their side surfaces that extend in parallel with an axial direction of the cables 1. The fixing force that can withstand the load during the connection and the positional accuracy (x, y, θ) of the connection end face of the cable assembly 10 can be retained only when a length of the hard portion 6, specifically, the sum (R1+R2) of the lengths of the first cable fixing portion 4 and the second cable fixing portion 5 in an axial direction of the cable 1 is a specified length or longer. Thus, the sum (R1+R2) of the lengths of the first cable fixing portion 4 and the second cable fixing portion 5 in the axial direction of the cable 1 is preferably about 3 mm to 10 mm.

Preferably, an axial length (R1) of the first cable fixing portion 4 is shorter than an axial length (R2) of the second cable fixing portion 5. Having the axial length (R1) of the first cable fixing portion 4 shorter than the axial length (R2) of the second cable fixing portion 5 allows a hard portion length of the cable connection structure 100 to be shortened. The hard portion length of the cable connection structure 100 results from the axial length (R1) of the first cable fixing portion 4, so that the axial length (R1) of the first cable fixing portion 4 is preferably made shorter. The axial length (R1) of the first cable fixing portion 4, if it is too short, however, results in a tendency toward deformation by pressure and heat during holding by the jig. Thus, preferably, the axial length (R1) of the first cable fixing portion 4 is set to be about 0.5 mm to 3 mm.

The soluble resin to be used as the material for the second cable fixing portion 5 is a resin to be dissolved in organic solvents or alkali. The soluble resin to be used as the material for the second cable fixing portion 5 does not necessarily have to be soluble in all types of organic solvents and alkali. The material is required only to be dissolved in the organic solvent or alkali that does not dissolve the first cable fixing portion 4 and dissolves the second cable fixing portion 5. In addition, the material preferably has such a high hardness as to ensure the fixing force that can withstand the load during connection to the mounting member 20 and positional accuracy. A photoresist and, in particular, a permanent resist having an epoxy resin as its main raw material may be suitably used for the soluble resin. The permanent resist having the epoxy resin as its main raw material has not only a high glass transition temperature of 200° C. or higher, but also a high hardness and thus can reduce thermal deformation during the joining of the mounting member 20 by heating.

The soluble resin to be used as the material for the second cable fixing portion 5 preferably has a coefficient of thermal expansion close to that of the insoluble resin to be used as the material for the first cable fixing portion 4. This is because of the following reason. Specifically, with a large difference in the coefficient of thermal expansion, a holding posture taken by the jig greatly changes during the heating of the mounting member 20 for connection to the cable assembly 10, resulting in reduced connection accuracy.

The soluble resin to be used as the material for the second cable fixing portion 5 preferably has a coefficient of thermal expansion close to that of the insulator material to be used for the jacket 3 of the cable 1. This is because of the following reason. Specifically, with a large difference in the coefficient of thermal expansion, a resultant thermal stress can degrade the connection accuracy due to a deformed cable 1 or cause the second cable fixing portion 5 to be separated from the jacket 3 of the cable 1 during the heating of the mounting member 20 for connection to the cable assembly 10. The soluble resin to be used as the material for the second cable fixing portion 5 has a coefficient of thermal expansion of 2 to $25 \times 10^{-5}$/° C., preferably, 2 to $10 \times 10^{-5}$/° C.

When the jacket 3 of the cable 1 is, for example, a fluorine-based resin, the surface of the jacket 3 is preferably etched by, for example, application of a surface treatment agent to thereby improve adhesion of the second cable fixing portion 5.

Figure 5:
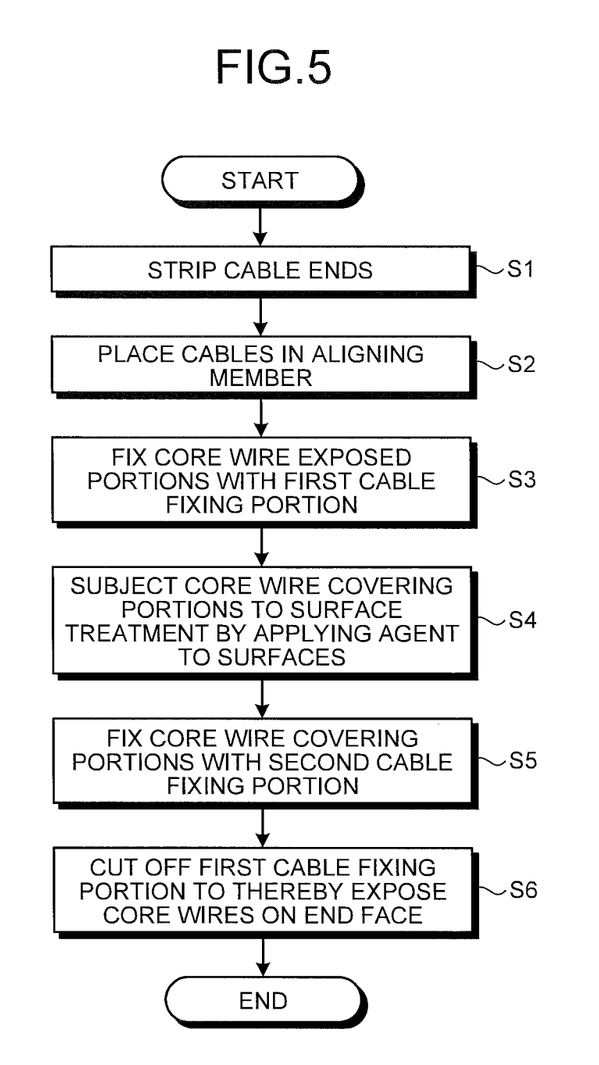
FIG. 5 is a flowchart of a process for manufacturing the cable assembly according to the embodiment.
Figure 6:
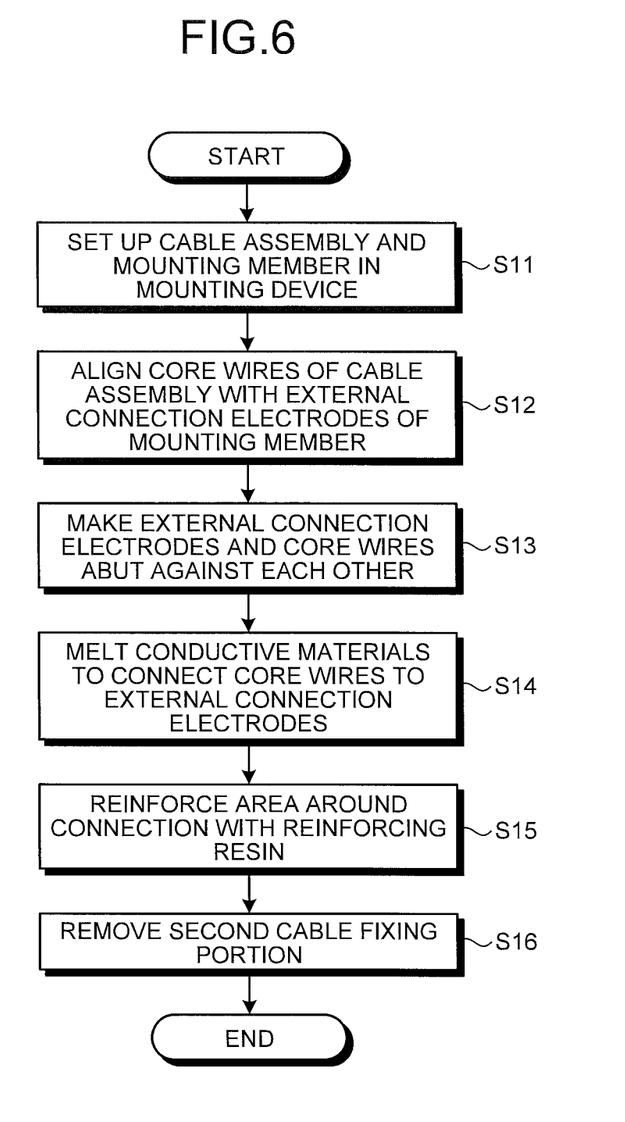
FIG. 6 is a flowchart of a process for manufacturing the cable connection structure according to the embodiment.
Figure 7:
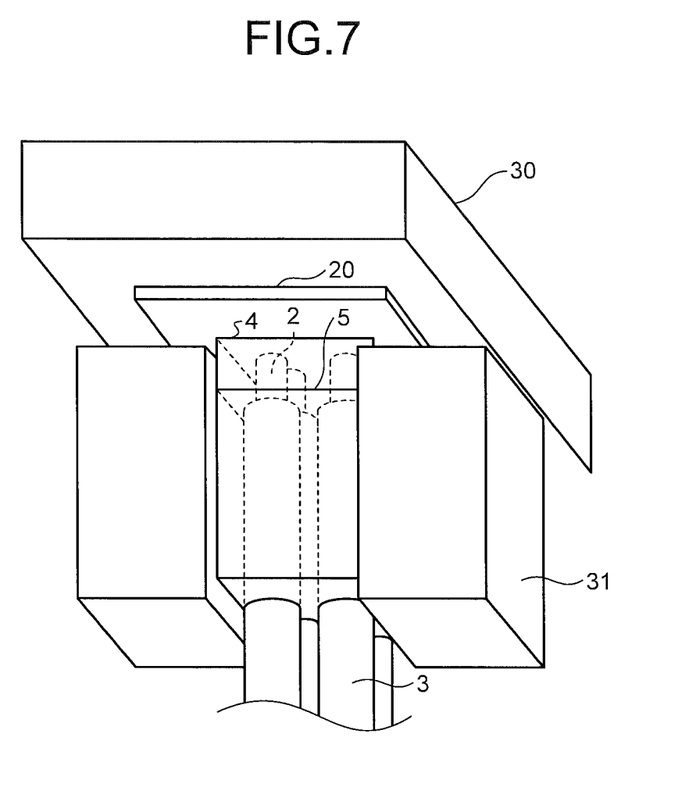
FIG. 7 is a perspective view for explaining a process for connecting the cable assembly to a mounting member.
Figure 8:
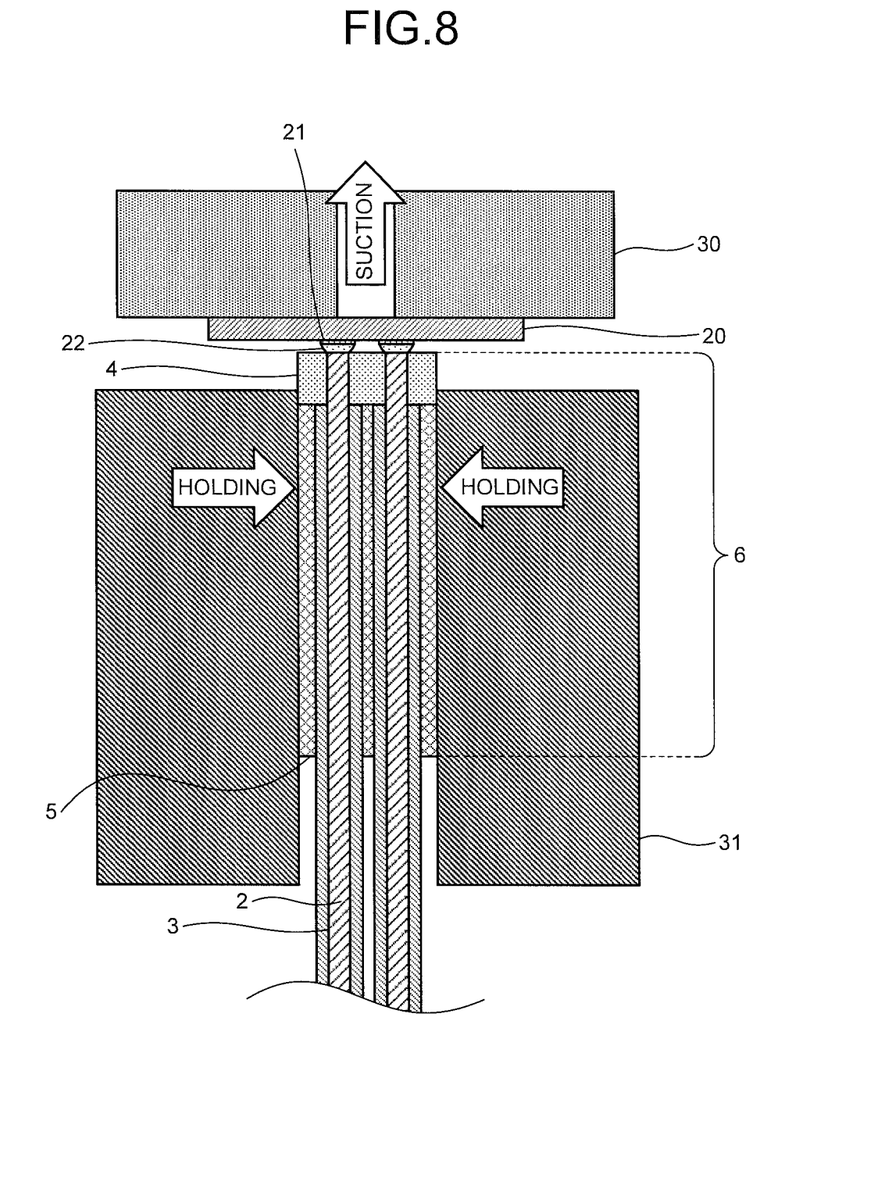
FIG. 8 is a sectional view for explaining the process for connecting the cable assembly to the mounting member.

Reference will be made to processes for manufacturing the cable assembly 10 and the cable connection structure 100 with reference to FIGS. 5 to 8. FIG. 5 is a flowchart of the process for manufacturing the cable assembly according to the embodiment of the present invention. FIG. 6 is a flowchart of the process for manufacturing the cable connection structure according to the embodiment of the present invention. FIG. 7 is a perspective view for explaining a process for connecting the cable assembly to the mounting member. FIG. 8 is a sectional view for explaining the process for connecting the cable assembly to the mounting member.

To manufacture the cable assembly 10, the jackets 3 at the ends of the cables 1 are first stripped to form the core wire exposed portions 7 over which the core wires 2 are exposed (Step S1).

Place the cables 1 in which the core wire exposed portions 7 are formed in an aligning member (Step S2). While the step of placing the cables 1 in the aligning member is being performed, preferably tensile stress is applied so as not to allow the core wire exposed portions 7 in the cables 1 to slack. In addition, placing the core wires 2 of the cables 1 in the aligning member is preferable for improved core wire positioning accuracy.

The core wire exposed portions 7 are fixed with the first cable fixing portion 4 (Step S3). The first cable fixing portion 4 is formed by filling a mold attached around the core wire exposed portions 7 with an insoluble resin and defoaming and then hardening the insoluble resin.

After the first cable fixing portion 4 has been formed (Step S3), the core wire covering portions 8 are subjected to surface treatment by applying an agent, such as a Tetra-Etch solution, to surfaces of the core wire covering portions 8 (Step S4). When the jackets 3 are a fluorine-based resin, etching the surface through the application of the agent improves resin adhesion.

The surface-treated core wire covering portions 8 are thereafter fixed with the second cable fixing portion 5 (Step S5). The second cable fixing portion 5 is formed by filling a mold attached around the core wire covering portions 8 with a soluble resin and defoaming and then hardening the soluble resin.

After the second cable fixing portion 5 has been formed (Step S5), the first cable fixing portion 4 is cut off to thereby expose cross sections of the core wires 2 on an end face of the first cable fixing portion 4, thus forming a connection surface (Step S6). A vertical or lateral pitch in the core wires 2 exposed on the connection end face of the first cable fixing portion 4 is equivalent to a length of a vertical or lateral pitch in the cables 1.

The cable assembly 10 can be manufactured as described above. Alternatively, the core wire exposed portions 7 may be formed by stripping the jackets 3 after the cables 1 have been placed in the aligning member. In addition, when the jackets 3 are not a fluorine-based resin, the surface treatment performed at Step S4 may be omitted.

To manufacture the cable connection structure 100, the cable assembly 10 and the mounting member 20 are first set up in a mounting device (Step S11). As illustrated in FIGS. 7 and 8, the cable assembly 10 is fixed in place by a jig 31 included in a stage of the mounting device. The jig 31 clamps and holds, from both sides, side surfaces of the cable assembly 10 extending in parallel with the axial direction of the cables 1, specifically, side surfaces of the first cable fixing portion 4 and the second cable fixing portion 5 extending in parallel with the axial direction of the cables 1. The mounting member 20 is fixed by a head unit 30 of the mounting device. The head unit 30 holds and fixes a back surface side of a mounting surface of the mounting member 20 through suction.

After the cable assembly 10 and the mounting member 20 have been set up in the mounting device (Step S11), the core wires 2 of the cable assembly 10 are aligned with the external connection electrodes 21 of the mounting member 20 (Step S12). The aligning step may be performed using, for example, a two-visual-field optical system.

After the aligning step, the core wires 2 of the cable assembly 10 and the conductive materials 22, such as the solder bumps, formed on the external connection electrodes 21 of the mounting member 20 abut against each other (Step S13). The abutment between the core wires 2 and the conductive materials 22 may be performed by lowering the head unit 30 or raising the stage of the mounting device.

After the abutting step, the conductive materials 22 are melted to thereby connect the core wires 2 to the external connection electrodes 21 (Step S14). The mounting member 20 is heated by the head unit 30 and a heating unit of the stage to thereby melt the conductive materials 22. It is noted that the temperature at which the mounting member 20 is to be heated by the head unit 30 and the heating unit of the stage is preferably equal to or lower than the glass transition point of the insoluble resin as the material for the first cable fixing portion 4 and the soluble resin as the material for the second cable fixing portion 5. This is because heating to a temperature equal to or higher than the glass transition point may cause the first cable fixing portion 4 and the second cable fixing portion 5 to be deformed, so that the holding posture taken by the jig 31 collapses. In addition, the heating temperature by the head unit 30 is preferably higher than the heating temperature by the stage. This is because of the following reason. Specifically, the stage temperature considerably affects the temperature of the jig 31 that holds the cable fixing portions. If the heating temperature by the stage is raised to an excessively high level, the first cable fixing portion 4 and the second cable fixing portion 5 deform and the holding posture of the cable assembly 10 taken by the jig 31 can collapse as described above.

After the connection has been made, the area around the connection is reinforced using the reinforcing resin 23 (Step S15). After the core wires 2 have been connected to the external connection electrodes 21, the cable connection structure is demounted from the mounting device. The area around the connection between the core wires 2 and the external connection electrodes 21 made by the conductive materials 22 is filled with the reinforcing resin 23. The reinforcing resin 23 is then hardened to reinforce the area around the connection.

The second cable fixing portion 5 is thereafter removed (Step S16). The cable connection structure reinforced with the reinforcing resin 23 is immersed in an organic solvent or alkali that dissolves the soluble resin as the material for the second cable fixing portion 5, to thereby remove the second cable fixing portion 5.

The cable connection structure 100 in the embodiment can be manufactured through the foregoing procedure.

The cable connection structure 100 according to the embodiment can highly accurately connect the external connection electrodes 21 of the mounting member 20 to the core wires 2 of the cables 1 and reduce the hard portion length of the cable connection structure 100. The embodiment has been described for a cable assembly that fixes therein four cables 1. The number of the cables 1 to be fixed is not, however, limited thereto.

Figure 9:
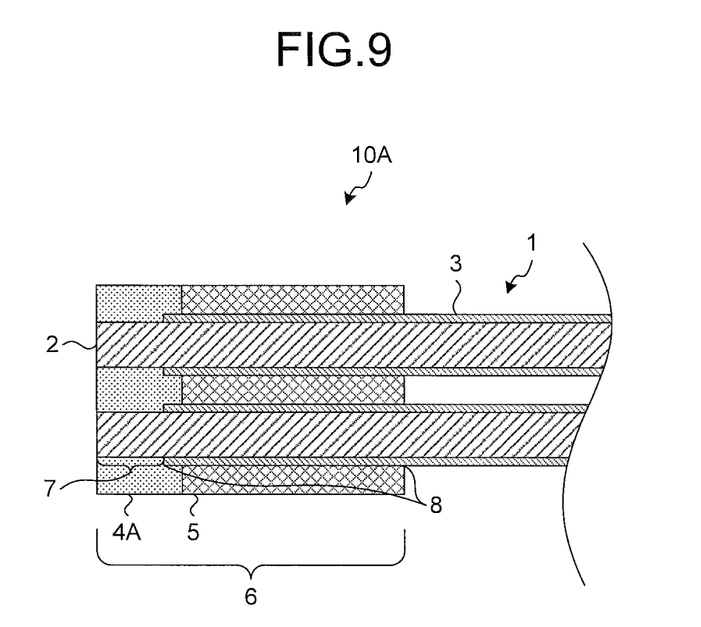
FIG. 9 is a sectional view of a cable assembly according a modification of the embodiment.

The first cable fixing portion 4 may be disposed so as to cover part of the jackets 3 as illustrated in FIG. 9. FIG. 9 is a sectional view of a cable assembly according a modification of the embodiment. In this cable assembly 10A according to the modification of the embodiment, a first cable fixing portion 4A fixes part of core wire covering portions 8 covered in jackets 3, in addition to core wire exposed portions 7 at distal ends of cables 1. When the first cable fixing portion 4A fixes only the core wire exposed portions 7 at the distal ends of the cables 1 and when a minute gap exists between the core wires 2 and the jackets 3 of the cables 1, a cleaning solution to remove the second cable fixing portion 5 may flow into the gap by a capillary phenomenon, damaging the core wires 2. In the cable assembly 10A according to the modification, the first cable fixing portion 4A fixes also the part of the core wire covering portions 8 covered in the jackets 3, so that entry of the cleaning solution through the minute gap between the core wires 2 and the jackets 3 can be prevented and damage to the core wires 2 can be prevented.

According to some embodiments, it is possible to highly accurately connect the external connection electrodes of the mounting member to the core wires of the cables and to reduce the hard portion length of the cable connection structure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cable connection structure comprising:
a cable assembly that fixes a plurality of cables, the plurality of cables extending in an axial direction; and
a mounting member connected to the cable assembly;
wherein the plurality of cables comprises:
core wires, each of which having a core wire exposed portion, each core wire exposed portion having:
a specified length of an outer peripheral surface of the core wire exposed in the axial direction; and
an end face of the core wire exposed; and
jackets, each of which is formed of an insulator, the jackets covering each of the core wires except for at least the core wire exposed portions;

wherein the mounting member comprises a plurality of external connection electrodes to which the core wires are to be connected;

the cable assembly further comprises a first cable fixing portion that is formed of an insoluble resin insoluble in organic solvents or alkali and that fixes and covers the entire outer peripheral surfaces of the core wire exposed portions except for the end faces of the core wires;

the core wires are exposed on an end face of the first cable fixing portion and are connected to the plurality of external connection electrodes using a conductive material;

the end face of each of the core wires being mounted to a respective one of the plurality of external connection electrodes parallel to a mounting surface of the mounting member, and the cable connection structure further comprises a reinforcing resin provided around the conductive material and around side surfaces of the first cable fixing portion.

2. The cable connection structure according to claim 1, wherein the reinforcing resin and the first cable fixing portion have a substantially identical coefficient of thermal expansion.

* * * * *